April 21, 1970  H. E. GEORGE  3,507,079
ROOF OVERHANG STRUCTURE

Filed Dec. 28, 1967  3 Sheets-Sheet 1

INVENTOR

BY  HENRY E. GEORGE

Miller, Morris, Pappas & McLeod
ATTORNEYS

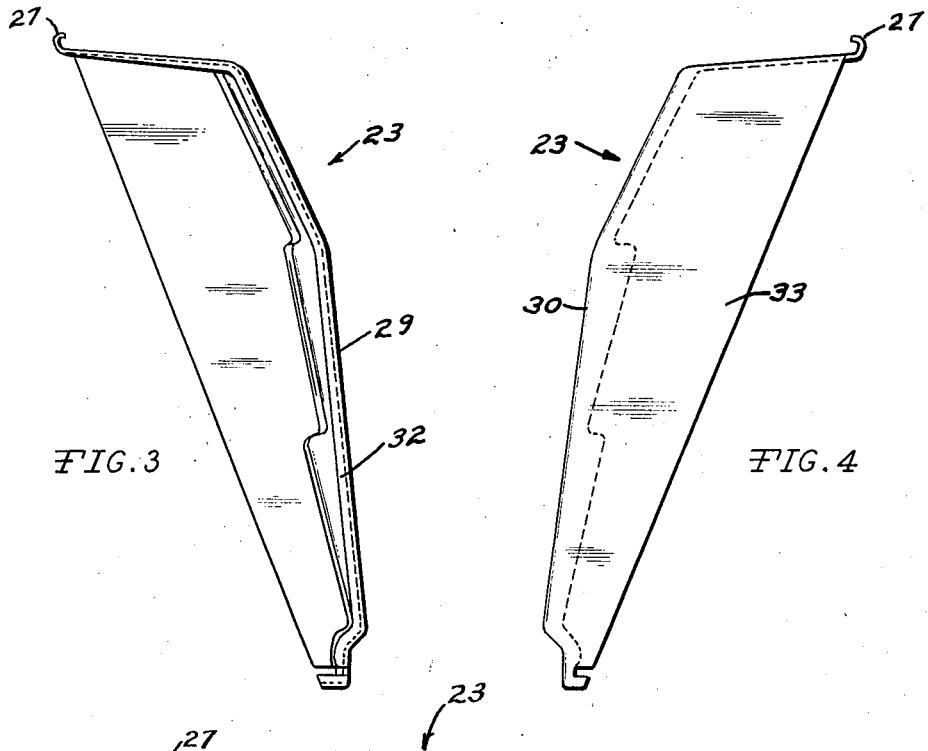
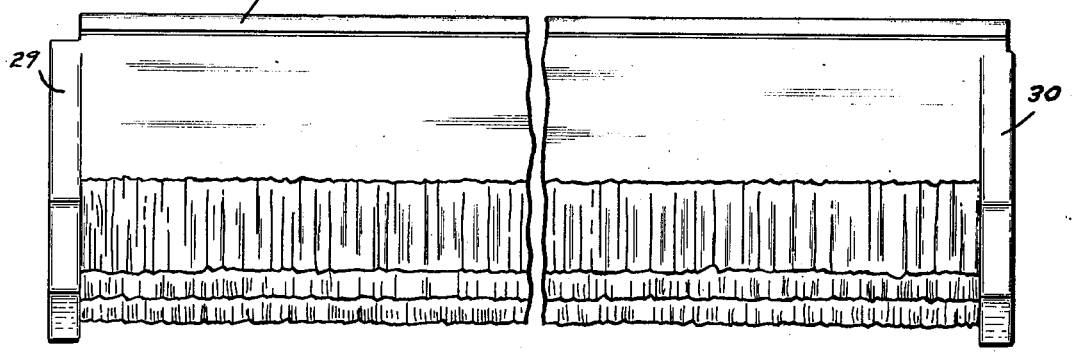
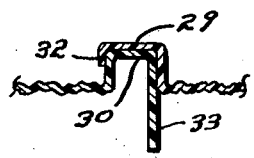

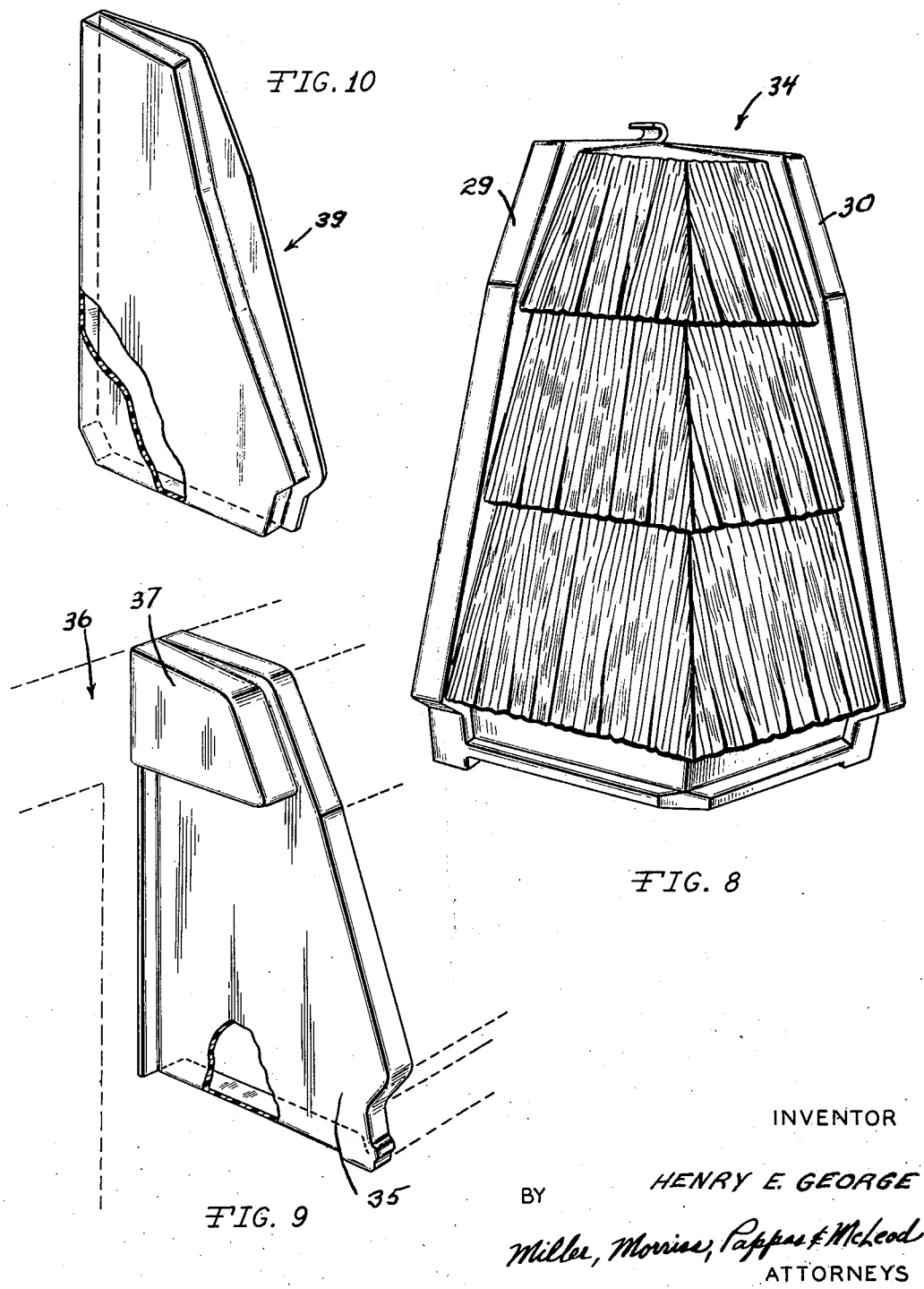

_United States Patent Office_ 3,507,079
Patented Apr. 21, 1970

3,507,079
ROOF OVERHANG STRUCTURE
Henry E. George, Dryden, Mich., assignor to Champion Home Builders Co., Dryden, Mich., a corporation of Michigan
Filed Dec. 28, 1967, Ser. No. 694,138
Int. Cl. E04c 1/39; E04d 1/08; E04f 19/08
U.S. Cl. 52—74         5 Claims

ABSTRACT OF THE DISCLOSURE

A mansard-like decorative roof overhang structure for trailer or building structures which consists of interlocking plastic roof panels and soffit closure panels supported in their use position by use of extruded support channels which are mounted along the upper portions of the trailer or building structure walls in a horizontally oriented parallel spaced apart position.

General description

This invention relates to a roof overhang structure which can be easily assembled and mounted upon a trailer or building structure so as to provide a highly utilitarian roof overhang while imparting a decorative mansard roof-type appearance thereto. More particularly, this invention comprises the use of elongate interlocking, decorative plastic panels which have been formed and/or embossed so as to selectively impart a shingle, cedar shake, tile or log appearance thereto.

Hitherto, trailer structures have all had the same basic overall configuration which consisted of an elongate box-like unit having four walls which merged into a roof member. Not only has this type of "box" construction been unimaginative in appearance, but no desirable roof overhang has been provided. The lack of roof overhang has resulted in problems due to the lack of protection from the elements. Rain, sleet and snow have hitherto fallen directly against the windows and doors of the trailers with resultant damage to the trailer structure. Further, in hot weather, the lack of shading afforded by a roof overhang has resulted in excessive heat within the trailer and has complicated the cooling of the trailer interior.

While this invention is primarily intended for use on mobile homes and trailers, it is also well adapted for use in connction with any fixed building structures, such as cottages, houses, commercial structures, garages and the like.

The object of this invention is to provide a unique decorative roof trim and framing structure therefor which is easily mounted on a trailer or building structure so as to impart any desired appearance thereto.

A further object of this invention is to provide a roof structure which can be easily installed on a trailer or building structure so as to provide a protective roof overhang thereon.

A still further object of this invention is to provide a decorative and protective roof overhang structure which is easily fabricated on a high volume basis and which can be quickly and cheaply installed on an already existing trailer unit or building structure with a minimum of expense and effort.

Other objects and advantages found in the construction of my invention will be apparent from a consideration of the following specification in connection with the appended claims and the accompanying drawings.

In the drawings:

FIGURE 3 is a left side elevational view of a decorative plastic panel in its use orientation and showing its left side open end confiugration.

FIGURE 4 is a right side elevational view of a decorative plastic panel in its use orientation and showing its right side bracer end configuration.

FIGURE 5 is a top view of the decorative plastic panel.

FIGURE 6 is a partial sectional view taken on line VI—VI of FIGURE 2 showing the overlap interlocking relationship between two adjacent decorative plastic panels mounted in their operative use position.

FIGURE 7 is a perspective view of a soffit closure panel.

FIGURE 8 is a perspective view of a decorative plastic panel which is configured to form the corner portion of the roof overhang assembly.

FIGURE 9 is a perspective view of a closure plastic panel which is utilized to define door and window recesses in the roof overhang assembly.

FIGURE 10 is a perspective view of an interior brace panel member.

In general, a roof overhang structure is provided for peripheral mounting along the upper portions of the side walls of a trailer or building structure so as to impart a decorative mansard roof type appearance thereto. Further, the invention provides a utilitarian roof overhang which is easily mounted on a mobile home or building structure.

Elongate decorative plastic panels are positioned in a slanted end-to-end interlocked manner to form the roof overhang structure. Special corner panels are provided to form the corner portions of the overhang structure. Further, the panels are positioned so as to slope downwardly and outwardly from the peripheral edges of the roof in the traditional mansard roof style.

The decorative plastic panels and soffit members are maintained in their use position by a pair of extruded channel support members which are mounted along the upper portion of the trailer or building walls in a horizontally oriented spaced apart position.

The upper extruded channel support member is positioned along the upper peripheral edges of the walls and is continuous around the entire trailer or building or for any desired distance therealong. The upper extruded channel support member is configured to engage and support the upper curved longitudinal edges of the interlocked panels proximate to and along the upper peripheral edge of the trailer or building structure.

The lower extruded channel support member is mounted on the wall in a continuous parallel spaced-apart position below the upper extruded support member. The lower extruded support member is configured to engage one longitudinal edge of a soffit closure panel so that the closure panel extends horizontally outwardly from the wall and is perpendicular to the surface thereof.

The lower longitudinal edge portion of each of the decorative plastic panels is configured to retentively engage the outer longitudinal edge of a soffit closure panel horizontally positioned therebelow.

A plurality of elongate soffit closure panels are positioned in end-to-end abutting relationship so as to form a continuous closure of the underside of the roof overhang structure.

Specific description

Figure 1:
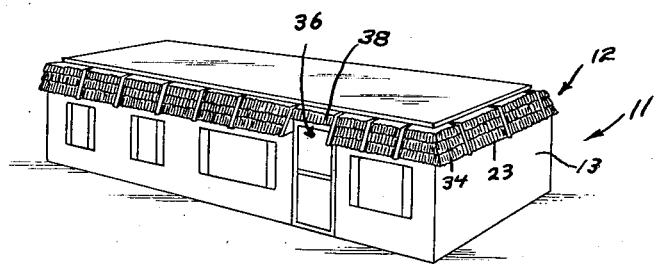
FIGURE 1 is a perspective view of a trailer unit having the roof overhang structure peripherally mounted around the upper portion thereof.

As shown in FIGURE 1, the trailer until 11 is provided with the roof overhang structure 12 mounted thereon along the upper peripheral edge portion of the trailer walls 13. Although the trailer unit is shown without the wheeled undercarriage, it is understood that the structural unit can be provided therewith.

Figure 2:
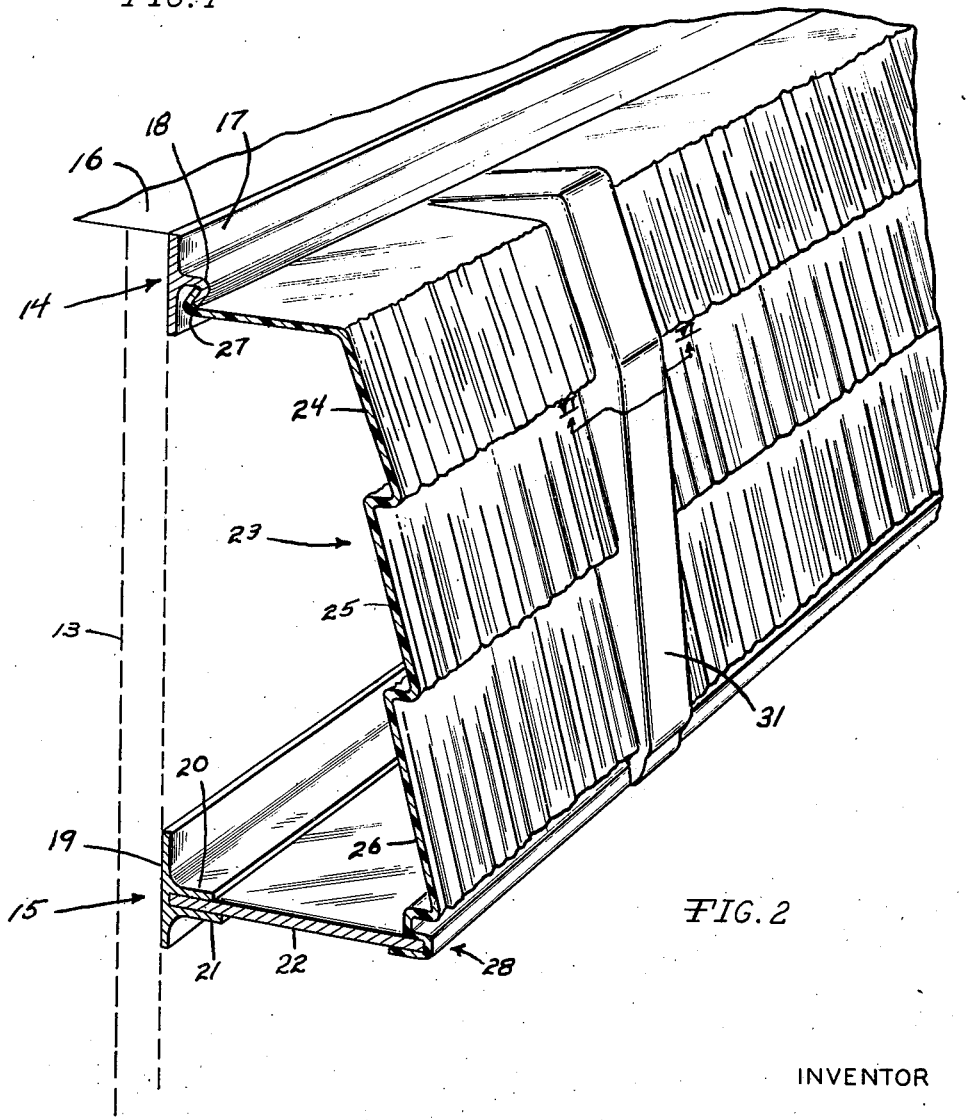
FIGURE 2 is an enlarged partial perspective view of the roof overhang structure showing the upper and lower channel support members, the horizontally oriented soffit panels, and the interlocking decorative panels supported thereby.

As shown in FIGURE 2, the roof overhang structure 12 is supported in its use position by an upper extruded channel support element 14 and a lower extruded channel support element 15. The upper channel support member 14 consists of an aluminum extrusion which is mounted along the upper horizontal edge portion of the wall 13 proximate to the roof 16. The upper support member 14 consists of a base plate portion 17 and a downwardly curved lip extension portion 18.

The lower support member 15 is also an aluminum extrusion which is mounted on the trailer wall below the upper support member 14 in a parallel spaced apart relationship thereto.

The lower support member 15 consists of base plate portion 19 with two parallel spaced apart flange portions, 20 and 21, respectively, extending outwardly therefrom. The lower flange portion 21 extends outwardly further than the upper flange portion 20. Both flange portions 20 and 21 cooperate to define a soffit-receiving channel therebetween.

A soffit closure panel 22 is provided as shown in FIGURES 2 and 7. The soffit closure panel 22 has an elongate rectangular configuration and may be fabricated from any suitable material, such as plywood, pressboard or plastic. One longitudinal edge of the soffit closure panel 22 is inserted into the channel formed between the flanges 20 and 21. The closure panel 22 is thus supported in its operative use position as shown in FIGURE 2.

The decorative plastic panel 23 is vacuum formed and in its preferred embodiment is made from ABS plastic (acrylo-nitrile-butadiene styrene). However, any resin or plastic having similar characteristics can be utilized. The hollow panel 23 is formed so that the front thereof gives an appearance of three overlapping parallel rows, 24, 25 and 26 of simulated cedar shakes, as shown in FIGURE 2. If desired, the appearance of the panel 23 can be changed to simulate logs, shingles or tile as desired. In its operative use position, the panel 23 slopes downwardly and outwardly with respect to the wall portion upon which it is mounted.

As shown in FIGURES 2, 3, 4 and 5, the plastic panel 23 is provided with a continuous curved lip extension 27 along the upper edge thereof. The lip extension 27 is configured to matingly, lockably and pivotably engage the downwardly curved lip extension 18 of the upper extruded channel support member 14.

The lower portion of the plastic panel 23 is configured to provide a channel 28 along the lower longitudinal edge thereof. As shown in FIGURE 2, the channel 28 is adapted to retainably receive the outer elongate longitudinal edge of the soffit panel 23. The channel 28 of the plastic panel 23 cooperates with the lower support member 15 to retainably engage and support the soffit panel 22 therebetween. This relative positioning is shown in FIGURE 2.

As shown in FIGURES 3 and 4, the ridge portion 29 is provided with a narrow lip 32, thus giving an open end construction to one end of the plastic panel 23. On the other hand, the ridge portion 30 is provided with a brace portion 33, thereby imparting a closed-end construction to the opposite end of the plastic panel 23. In the interlocked use position with adjacent panels in the manner shown in FIGURE 6, the brace portions 33 impart support and rigidity to the entire roof overhang structure.

As shown in FIGURE 5, the plastic panel 23 is provided with raised hollow vertically oriented ridge portions 29 and 30, respectively, at each end thereof. The ridge portion 30 of one plastic panel 23 is configured to interlockably nest within the ridge portion 29 of the next adjacent panel. This nesting or overlapping interlock is shown in detail in the partial sectional view of FIGURE 6. Thus overlapped the ridge portions of adjacent panels cooperate to form vertically oriented spaced apart simulated beam members 31 in the completed roof overhang structure 12.

As shown in FIGURE 8, a hollow plastic corner panel member 34 is provided which matingly interlocks with adjacent panel members 23 to form the corner portions of the roof overhang assembly. The corner panel member 34 is also provided with corresponding ridge portions 29 and 30 which interlockably nest with ridge portions of next adjacent panel members in the manner shown in FIGURE 6.

As shown in FIGURE 9, a hollow closure plastic panel 35 is provided which interlocks with an adjacent plastic panel member 23 to define a door or window recess 36 in the roof overhang structure. The closure panel 35 is provided with a hollow support extension 37 which supports a cover panel 38 that is positioned above the window or door as shown in FIGURE 1. It is understood that the closure panels 35 are utilized in mirror image pairs so as to form the door and window recesses therebetween.

As shown in FIGURE 10, an interior brace member 39 is provided for selective use as a reinforcing support member between the wall 13 and selected of the simulated beam portions 31.

It is to be understood that suitable retainer nails, screws and bolts (not shown) are utilized in connection with the components of the roof overhang structure so as to mount and assemble them in their operative use position on the walls of the trailer or building structure.

It is also contemplated that the cross-sectional configuration of the upper and lower extruded support members can be varied as desired as long as they accomplish their primary retaining and support function. Further, it is contemplated that the decorative roof panels and soffit closure panels may be maintained in their operative use positions by directly connecting or attaching one or both of them to the wall member.

It is thus seen that a roof overhang structure assembly is provided which is comprised of easily fabricated light weight components that can be quickly and economically mounted upon existing trailer and building structures. Not only does the roof overhang structure impart a decorative appearance to the structure upon which it is mounted, but it also provides a highly utilitarian protective overhang element for the structure upon which it is mounted.

Having thus set forth the nature of my invention, I claim the following:

1. In a roof overhang structure, the combination including:
   (a) a plurality of elongate decorative roof panel members positioned in a continuous end-to-end relationship, said panel members having upper and lower longitudinal edge portions, each of said panel members having one of its ends overlapping an adjoining end of the next adjacent of said panel members, with said one end and said adjoining end being interlockingly connected so that said panel members form a continuous roof overhang structure,
   (b) a plurality of soffit closure panel members positioned in a horizontaly oriented end-to-end abutting relationship below said roof panel members, said soffit closure panel members engaging said roof panel members along the lower longitudinal edge portions thereof; and
   (c) upper and lower parallel spaced apart support means provided for mounting on a wall member, said support means configured to lockably retain said roof panel members and said soffit members in a mansard-type roof overhang configuration.

2. In a roof overhang structure as claimed in claim 1 wherein each of said roof panel members are provided with a curved lip extension along the upper longitudinal edge thereof, said curved lip extension adapted to retainably engage the upper of said support means, each of said roof panel members further defining a soffit panel receiving channel portion along the lower longitudinal edge thereof.

3. In a roof overhang structure as claimed in claim 1 wherein selected of said interlocking roof panel members have a ninety degree angular configuration about a vertically oriented center axis, said selected roof panel members configured to form a corner portion of said continuous mansard-type roof overhang structure.

4. In a roof overhank structure, the combination including:
  (a) an upper elongate extruded element provided with a downturned lip extension in cross section and a flange plate base portion;
  (b) a lower elongate extruded element in spaced apart parallel relation to said upper elongate extruded element and provided with a horizontal channel portion in cross section and a flanged base in substantial plane register with said flange plate of said upper extruded element;
  (c) a soffit closure panel positioned in said channel of said lower extruded element and supportably extending horizontally therefrom; and
  (d) a decorative embossed roof panel lockably and pivotally secured in said downturned lip of said upper extruded element and channeled along the lower edge thereof to supportably receive the outer longitudinal edge of said soffit closure panel.

5. In a roof overhang structure, the combination including:
  (a) a plurality of interlocking elongate decorative roof panel members, each of said roof panel members having hollow raised vertically oriented ridge portions at each end thereof, each of said ridge portions adapted to nestably interlock with the ridge portion of the next adjacent panel member so as to form a continuous mansard-type roof panel structure;
  (b) a plurality of soffit closure panel members positioned in a horizontally oriented end-to-end abutting relationship below said roof panel members, said soffit closure panel members engaging said roof panel members along the lower longitudinal edge portions thereof; and
  (c) upper and lower parallel spaced apart support means provided for mounting on a wall member, said support means configured to lockably retain said roof panel members and said soffit members in a mansard-type roof overhang configuration.

References Cited

UNITED STATES PATENTS

| | | | |
|---|---|---|---|
| 3,015,861 | 1/1962 | Hupp | 52—74 |
| 3,178,777 | 4/1965 | Nadel et al. | 52—94 X |
| 3,181,275 | 5/1965 | Schroter et al. | 52—94 X |
| 3,217,453 | 11/1965 | Medow | 52—314 |
| 3,312,031 | 4/1967 | Berg | 52—316 X |

PRICE C. FAW, JR., Primary Examiner

U.S. Cl. X.R.

52—94, 314, 497, 519, 555